United States Patent [19]

McKenzie

[11] Patent Number: 4,912,814
[45] Date of Patent: Apr. 3, 1990

[54] BOLO CLASP

[76] Inventor: Shirley D. McKenzie, 551 S. Memorial Dr., Tulsa, Okla. 74112

[21] Appl. No.: 394,315

[22] Filed: Aug. 14, 1989

Related U.S. Application Data

[63] Continuation of Ser. No. 189,392, May 2, 1988, abandoned.

[51] Int. Cl.[4] .............................................. A41D 25/14
[52] U.S. Cl. ..................................... 24/115 H; 24/49 S
[58] Field of Search ............. 24/115 R, 115 H, 49 S, 24/49 C, 49 CC, 49 R, 332, 593, 594, 596, 613, 617; 403/229, 146, 166

[56] References Cited

U.S. PATENT DOCUMENTS

| | | | |
|---|---|---|---|
| 1,185,348 | 5/1916 | Rutledge et al. | 24/49 S |
| 1,977,180 | 10/1934 | Forbes | 403/229 |
| 2,105,178 | 1/1938 | Berndt | 403/166 |
| 2,537,703 | 1/1951 | Randa | 24/232 |
| 2,637,884 | 5/1953 | Morehouse | 24/49 S |
| 2,840,404 | 6/1958 | Weber, Jr. | 403/146 |
| 2,896,217 | 7/1959 | Cedarstaff | 24/49 S |
| 3,025,093 | 3/1962 | Millman | 24/595 |
| 3,039,770 | 6/1962 | Ferretti | 403/229 |
| 3,187,396 | 6/1965 | Carroll | 24/115 R |
| 3,675,277 | 7/1972 | Day | 24/115 H |
| 3,930,380 | 1/1976 | Fogt | 403/229 |

Primary Examiner—Victor N. Sakran
Attorney, Agent, or Firm—Head & Johnson

[57] ABSTRACT

A bolo clasp for a bolo tie of the type which includes a braided cord extending around the neck of the wearer, the cord having two ends, the cord being received by the bolo clasp so that the two ends extend below the bolo clasp and the clasp allows adjustment of the length of the cord extending below the clasp, the clasp including a base with a short base post extending upwardly therefrom. The base defines a pair of recesses that open towards the base. A clamping member is disposed between the base and each of the recesses. A short clamping member post is affixed to the clamping member and extends toward and in alignment with the base post. A coiled compression spring has opposed ends, one end thereof receiving the base post and the other end receiving the clamping member post so that the clamping member is urged towards the base opposed recesses to resiliently retain the cords of a bolo tie therebetween.

1 Claim, 1 Drawing Sheet

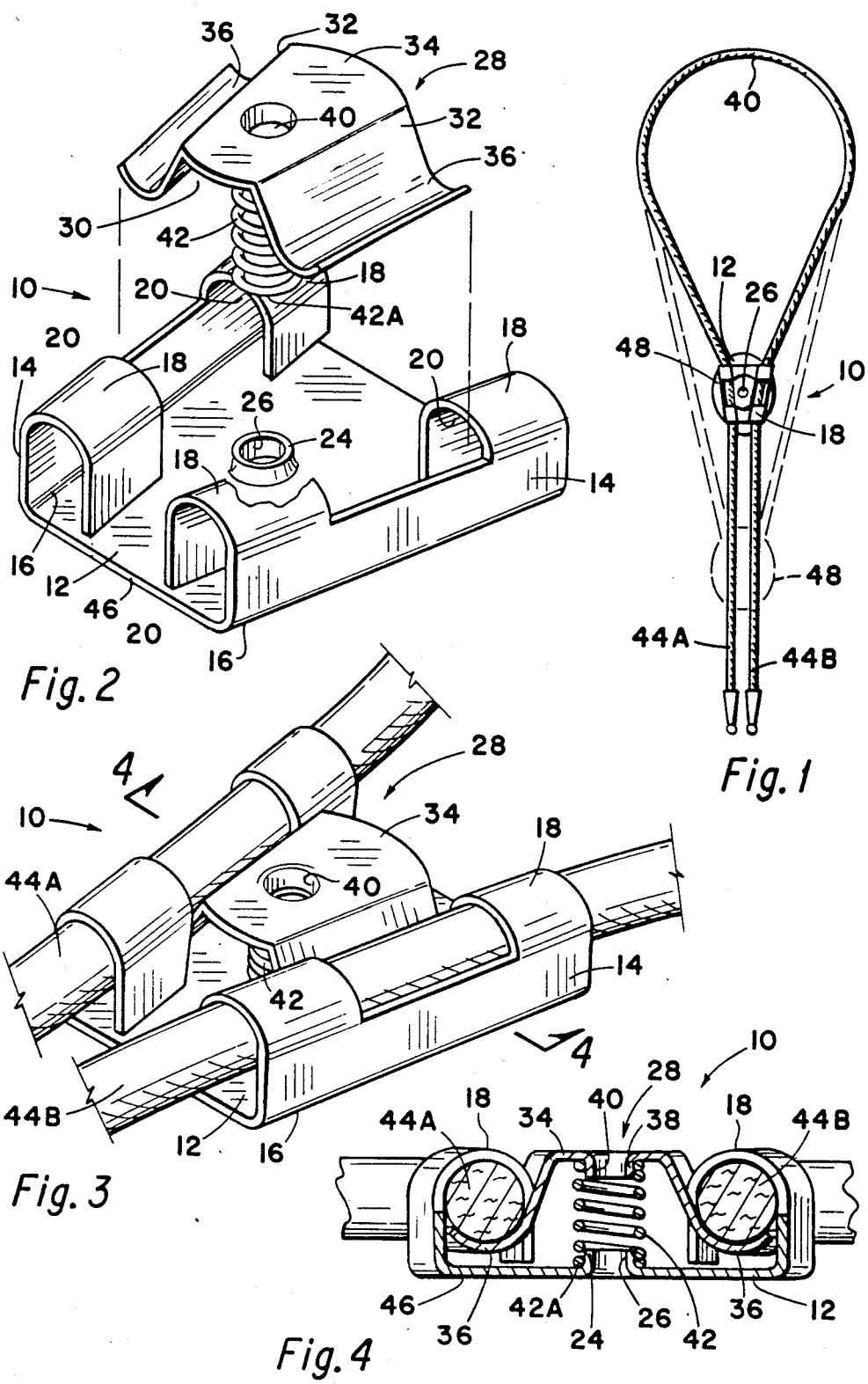

BOLO CLASP

This is a continuation application of copending application Ser. No. 189,392, filed May 2, 1988, now abandoned.

SUMMARY OF THE INVENTION

A type of tie, usually associated with western wear, but now frequently worn by men the world over; is known as the "bolo tie". A bolo tie is formed of a cord, usually braided, which loops around the neck of the wearer and is retained by a bolo clasp with the free ends of the cord extending below the clasp. The clasp forms a base for attaching an ornamental device and the primary function of the clasp is to permit easy adjustment of the cord. Adjustment is necessary to make the bolo tie easy to extend over or remove from around the head of the user and at the same time permit free and easy adjustment of the clasp, with the ornamental portion affixed thereto so as to permit positioning of the ornamental portion so that it will appear at about the same height on the neck of the wearer as the usual knot in a standard tie.

A very successful bolo clasp is encompassed in U.S. Pat. No. 3,675,277 entitled "Bolo Clasp" and issued July 11, 1972. The bolo clasp therein illustrated and described has been very widely received by the public and has become a standard item for use in manufacturing bolo ties. The present invention is directed towards an improvement in the bolo clasp of U.S. Pat. No. 3,675,277.

In the bolo clasp illustrated and described in the aforementioned United States Patent a rather complex means for guiding the movement of the clamping member relative to the base member is employed. This guiding means includes the use of integral upstanding tabs formed with the base member, the tabs being received in small slots formed in the clamping member. Providing these small slots and tabs is a relatively expensive manufacturing procedure.

In addition, the bolo clasp of the aforementioned United States Patent includes the use of a coiled compression spring to provide resilient biasing of the clasping member relative to the base. The small diameter coil spring functions successfully to provide such resilient biasing force, however, the design as illustrated and described in the aforementioned United States Patent does not include any means of retaining the coil compression spring in its proper position between the base member and the clasping member.

The present invention is directed towards an improvement in the bolo clasp of the type illustrated and described in U.S. Pat. No. 3,675,277. The improved bolo clasp eliminates the necessity for guiding means between the base and the clasping member and provides for means to securely retain the coiled compression spring in its proper position between the base member and the clasping member.

A better understanding of the invention will be had by reference to the following description and claims, taken in conjunction with the attached drawings.

DESCRIPTION OF THE DRAWINGS

FIG. 1 is an elevational view of a complete bolo tie having the clasp portion of the present invention used thereon and showing in solid outline the position of the bolo clasp when it is worn by a user; and in dotted outline, the position of the bolo clasp when the tie is adjusted so that it can easily be taken on or removed from the neck of the user. FIG. 1 shows the view from the rearward side and with the rearward view of an ornamental element which has been affixed to the front of the clasp.

FIG. 2 is an isometric exploded view of the improved bolo clasp of this invention.

FIG. 3 is an assembled view of the bolo clasp of FIGS. 1 and 2 and showing the cords forming a part of the bolo tie as received by the bolo clasp.

FIG. 4 is a cross-sectional view taken along the line 4—4 of FIG. 3.

DESCRIPTION OF THE PREFERRED EMBODIMENT

Referring to the drawings, there is shown a bolo clasp indicated generally by the numeral 10, comprising a sheet metal member providing a base 12 having upstanding flanges 14 bent up from the sheet material of the clasp along bend lines 16 that are inclined to each other at a small acute angle. Flanges 14 are further bent over toward each other in arcuate bends to form lips 8 which define on their inner side's recesses 20 that extend lengthwise of and parallel to their respective bend lines 16 and that are disposed between lips 18 and base 12. The lips 18 are in two portions spaced lengthwise from each other by a gap 22.

Integrally formed with base 12 is a short upstanding post 24. In the preferred and illustrated arrangement, post 24 is formed as an integral short length tubular portion surrounding an opening 26. The post 24 can be easily produced by a punching or die forming operation.

A clamping member 28 is also provided, in the form of a strip of metal which has been bent to a hat-shaped cross section. A central recess 30 is thus formed by the portion of the hat-shaped cross section corresponding to the crown of the hat, the recess 30 being bordered laterally by sides 32 disposed at an angle to the plane of base 12, and a bottom 34 disposed generally parallel to the plane of base 12. Ears 36 extend outwardly from the inner ends of sides 32, and correspond in the hat-shaped cross section to the brim of a hat. The outer ends of ears 36 are concave and open away from base 12 and toward recesses 20, as best seen in FIG. 4.

Integrally formed with clasping member 28 is a short downwardly extending post 38. In the preferred and illustrated arrangement, post 38 is formed as an integral short length tubular portion surrounding an opening 40. The post 37 can easily be produced by a punching or die forming operation. Clasping member post 38 is in axial alignment with base post 24.

A coiled compression spring 42 has a first end 42A which receives base post 24 and a second end 42B which receives clasping member post 38.

To assemble the bolo clasp, it is necessary only to move the parts together from the position shown in FIG. 2 to the position shown in FIG. 3. The ears 36 pass through the gaps 22. Pressure of the finger on bottom 34 then forces clamping member 28 toward base 12 against the action of spring 42. The ends 44A and 44B of the bolo cord 44 can then be slipped lengthwise through the recesses 20 between the lips 18 and the ears 36, to the position shown in FIGS. 3 and 4, after which the pressure on clamping member 28 can be released and spring 42 will urge clamping member 28 to the position of FIGS. 3 and 4 in which the lips 18 and the ears 36 grasp and releasably clamp the cord 44 between them. Also, to slide clasp 10 back and forth on the cord 24, it is necessary only to press on opposite surfaces of bottom 34 of clamping member 28 and the bottom of base 12 in order to move the clamping member and the base toward each other to release the clamping pressure on the cord.

In speaking of recesses 20, it is considered that each recess 20 extends the full length of clasp 10, and that the gap 22 does not interrupt the recess itself, but only interrupts the lips 18 which define the recess. Thus, in this sense, the ears 36 pass through the recess on assembly and disassembly and are opposed to the recess despite the fact that the ears 36 do not actually underlie the spaced portions of the lips 18.

The bolo clasp is shown in rearward view in its final form in FIG. 1. The surface 46 of base 12 opposite clamping member 28 may be used as a base for cementing on a stone or other decoration 48 as indicated in FIG. 1.

With the clasp assembled on a cord 40 as shown in FIGS. 1, 3 and 4, the spring 42 retains the clasp in secure position relative to the cord until finger pressure is applied to compress the clasping member 28 towards the base 12, compressing spring 42. The post 38 and 24 serve to securely retain the spring 42 in position and prohibit it from being inadvertently dislodged.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A bolo clasp comprising:
a base means carried by the base defining a pair of recesses that open towards each other, said base having an opening therein and a circumferential short, generally tubular integral portion forming a base post positioned between said recess defining means, a clamping member positioned adjacent and parallelled said base and within said recesses, the clamping member having an opening therein and a circumferential short generally tubular portion forming a clamping member post extending towards and in alignment with said base post, means yieldably urging the clamping member away from the base, said yieldable means comprising a coiled compression spring disposed between the base and the clamping member, the coiled compression spring having opposed ends, one end thereof receiving said base post and the other end thereof receiving said clamping member post, and wherein said base is formed of a metal sheet having its edges bent up and over to define two pairs of spaced apart flanges providing said recesses, each of said flanges extending in U-shaped arrangement to close proximity of said base, any space between said flanges and said base being insufficient to permit said clamping member to be displaced laterally with respect to said base, said clamping member having a hat-shaped cross section defining a recess that opens towards the base with opposed ears which extend outward of each other, each of said ears extending between a said pair of flanges whereby said clamping member is guided in its full up and down movement towards and away from said base but restrained by said flanges from being laterally displaced relative to said base.

* * * * *

UNITED STATES PATENT AND TRADEMARK OFFICE
CERTIFICATE OF CORRECTION

PATENT NO. : 4,912,814

DATED : Apr. 3, 1990

INVENTOR(S) : Shirley D. McKenzie

It is certified that error appears in the above-identified patent and that said Letters Patent is hereby corrected as shown below:

On the title page, in item number [54] and in column 1, line 2, change "BOLO" to --BOLA--.

On the title page, in item number [57] ABSTRACT, lines 1, 4, 5 and 17, change "bolo" to --bola--.

Column 1, lines 11, 13, 17, 25, 26, 27, 30, 31, 33, 42, 53, 55, 65, and 68, change "bolo" to --bola--.

Column 2, lines 1, 8, 9, 11, 17, 57, and 63, change "bolo" to --bola--.

column 3, line 16, change "bolo" to --bola--.

Column 4, line 6, change "bolo" to --bola--.

Signed and Sealed this

Fifteenth Day of October, 1991

*Attest:*

HARRY F. MANBECK, JR.

*Attesting Officer*     *Commissioner of Patents and Trademarks*